United States Patent [19]

Altenberg

[11] Patent Number: 4,604,410

[45] Date of Patent: Aug. 5, 1986

[54] MANUFACTURING OF RIGID FOAM USING ETHERIFIED MODIFIED AROMATIC POLYOLS

[75] Inventor: Milton J. Altenberg, Houston, Tex.

[73] Assignee: Chardonol Corporation, Houston, Tex.

[21] Appl. No.: 668,254

[22] Filed: Nov. 5, 1984

Related U.S. Application Data

[63] Continuation-in-part of Ser. No. 513,502, Jul. 13, 1983.

[51] Int. Cl.$^4$ .................. C08G 18/42; C08G 18/14
[52] U.S. Cl. ..................... 521/172; 521/48.5; 521/173; 521/902; 560/91
[58] Field of Search ............ 521/48.5, 172, 173; 560/91

[56] References Cited

U.S. PATENT DOCUMENTS 4,469,824  9/1984  Grigsby .................. 521/173
4,485,196  11/1984  Speranza ................ 521/173

Primary Examiner—C. Warren Ivy
Attorney, Agent, or Firm—Vaden, Eickenroht, Thompson & Boulware

[57] ABSTRACT

Rigid polyurethane and polyisocyanurate foams are prepared by reacting an excess of an organic polyisocyanate with an etherified modified aromatic polyol. The etherified modified aromatic polyol is prepared by digesting scrap polyalkylene terephthalate polymers with a low molecular weight polyol. The digested polyol is reacted with a low molecular weight polyhydroxy compound containing from about 3 to about 8 hydroxyl groups to form an intermediate product which is alkoxylated with 1 to 4 mols of ethylene oxide and/or propylene oxide to produce a low viscosity etherified modified aromatic polyol which displays excellent stability over long term storage. The etherified modified aromatic polyol is useful in the manufacture of good quality polyurethane and polyisocyanurate foams having improved properties.

27 Claims, No Drawings

MANUFACTURING OF RIGID FOAM USING ETHERIFIED MODIFIED AROMATIC POLYOLS

RELATED PATENT APPLICATION

This application is a continuation-in-part of copending U.S. patent application Ser. No. 513,502, filed July 13, 1983 for Milton J. Altenberg et al. and entitled "Low Viscosity Aromatic Polyols and Methods for Their Preparation".

BACKGROUND OF THE INVENTION

1. Field of the Invention

The present invention relates generally to the preparation of polyurethane and polyisocyanurate polymers, and polymer foams from etherified modified aromatic polyols (low viscosity aromatic polyols) derived from digested polyols of the type made by the digestion of a polyalkylene terephthalate with a low molecular weight polyol such as ethylene glycol or diethylene glycol to provide a digested polyol, next reacting the digested polyol with a low molecular weight polyhydroxy compound having from about 3 to about 8 hydroxyl groups to provide an intermediate product and thereafter alkoxylating the intermediate product with ethylene oxide and/or propylene oxide to thereby provide an etherified modified aromatic polyol having improved physical properties. The etherified modified aromatic polyol has enhanced utility as a raw material for use in the manufacture of polyurethane foams and polyisocyanurate foams.

2. Description of the Prior Art

Polyurethane and polyisocyanurate polymers and polymer foams are formed by the reaction between an isocyanate and a polyol having at least two hydroxyl groups. For polyisocyanurate foams, the molar ratio of isocyanate to polyol will be greater than 1 to 1, usually equal to or greater than 2 to 1. Polyurethane and polyisocyanurate foams are produced by the reaction of the isocyanate and the polyol in the presence of a suitable blowing agent, surfactant and catalyst. The degree of rigid compressive strength or flexible load deflection is determined, in part, by the functionality and molecular weight of the isocyanate and the polyol.

Aromatic polyester polyols (digested polyols) useful for the production of polyurethane and polyisocyanurate foams can be derived from polyalkylene terephthalate polymers, such as polyethylene terephthalate (PET), and by digestion of the polymer with various low molecular weight aliphatic polyols, such as polyhydric alcohols.

The use of aromatic ester polyols obtained from polyalkylene terephthalate polymers for the preparation of polyurethanes and polyisocyanurates has a number of advantages. First, the polyalkylene terephthalate polymers can be obtained from scrap materials such as used photographic film, synthetic fibers, plastic bottles such as those used in the soft drink industry, and waste from the production of other products made from polyalkylene terephthalate polymers.

Despite these advantages, the results have not been entirely satisfactory. Polyols produced by digesting polyalkylene terephthalate polymers suffer from a number of disadvantages. The digestion products are highly viscous, typically having viscosities in the range from about 20,000 cps to solid at room temperature. Although the digested polyols can be blended with conventional polyols in order to lower the overall viscosity of the combined polyols, the resulting mixtures are not always stable and are susceptible to crystallization on storage. In addition, the digested polyols have limited solubility in fluorocarbon blowing agents and foams made therefrom can be dimensionally unstable. There is a need for a simple, yet flexible process for adjusting the physical and chemical properties of aromatic polyols so that the foregoing and related problems can be overcome and, in particular, so that different grades of aromatic polyols can be provided for specific end-use applications (e.g. low isocyanate index formulations, high isocyanate index formulations, rigid polyurethane formulations, rigid polyisocyanurate formulations, etc.).

Kaiser et al. U.S. Pat. No. 3,167,538 issued Jan. 26, 1965, discloses the preparation of polyols suitable for use in the manufacture of rigid polyurethane foam by alkoxylating a mixture of methyl glucoside with a polyhydric alcohol and an amino hydroxy compound. Kaiser et al. point out that when methyl glucoside is alkoxylated there are numerous problems because the methyl glycoside is a high melting solid which must be heated in order to become liquefied and suitable for alkoxylation. This tends to result in off color products which have excessive viscosities.

Schoepfle et al. U.S. Pat. No. 3,249,562 issued May 3, 1966, is directed to the preparation of polyurethane foam having improved fire resistance made by reacting a polyisocyanate with a polyester having a phosphinic acid. chemically combined therein.

Falkenstein et al. U.S. Pat. No. 4,035,313 issued July 12, 1977, is directed to polyisocyanurate foams having improved fire retardancy properties prepared by reacting a polyisocyanate and a polyester polyol containing N,N'-bis-(ethanol-2)-diaminooctachlorodiphenyl.

U.S. Pat. No. 4,048,104 to Svoboda et al. describes a method wherein an organic polyisocyanate, e.g., toluene diisocyanate is reacted with the digested polyol to form a prepolymer which is substantially free of unreacted hydroxyl radicals. The polyisocyanate prepolymer is then combined with additional polyol, a suitable blowing agent, a surfactant, and a catalyst in order to produce the desired flexible polyurethane.

U.S. Pat. No. 4,223,068 to Carlstrom et al. discloses the use of a digested polyol combined with a low molecular weight polyol in the production of rigid polyurethane foams. The amount of the digestion product present relative to the total organic polyol can be no more than 30% in order to retain the desired physical properties of the foam, particularly compressive strength and dimensional stability.

DeGuiseppi et al. U.S. Pat. No. 4,237,238 issued Dec. 2, 1980 discloses the preparation of polyisocyanurate foams having improved fire retardancy properties wherein the polyol that is used is a polyol prepared by the transesterification with a glycol of a residue obtained from the manufacture of dimethyl terephthalate.

Kolakowski et al. U.S. Pat. No. 4,039,487 issued Aug. 2, 1977, disclose polyisocyanurate foams having improved fire retardancy properties prepared by using, as a portion of the polyol component, a hydroxy terminated aromatic polyester prepared by reacting an excess of a polyethylene glycol with an aromatic polycarboxylic compound.

Satterly et al. U.S. Pat. No. 4,233,408 issued Nov. 11, 1980, discloses the manufacture of rigid polyurethane foam using a polyester polyol prepared by etherifying a waste stream of nonvolatile by-product from the oxidation of cyclohexane to cyclohexanone with a polyol.

Svoboda et al. U.S. Pat. No. 4,417,001 issued Nov. 22, 1983, discloses isocyanurate foam prepared from a polyol prepared by digesting polyalkylene terephthalate residues with organic polyols.

Brennan U.S. Pat. No. 4,439,549, which issued Mar. 27, 1984, on the basis of a patent application filed November 22, 1982, is directed to aromatic polyols containing ester functionalities suitable for use in making rigid polyurethane foam. The aromatic polyols are prepared by reacting a polyethylene terephthalate residue with an alkylene oxide in the presence of a basic catalyst.

Zimmerman et al. U.S. Pat. No. 4,442,237, which issued Apr. 10, 1984 on the basis of a patent application filed Nov. 22, 1982, is directed to aromatic polyols suitable for use in manufacturing rigid foam. The aromatic polyols are prepared by reacting a phthalic acid residue such as a residue from the manufacture of polyethylene terephthalate with an amino alcohol containing at least one tertiary amino group and at least one hydroxyl function and also with an alkylene glycol such as ethylene glycol or diethylene glycol. There is a statement that it is expected that useful novel aromatic polyol mixtures may be made with polyethylene terephthalate (PET) in place of the DMT residue used in the first step.

Zimmerman et al. U.S. Pat. No. 4,442,238, which issued Apr. 10, 1984 on the basis of a patent application filed Nov. 22, 1982, is directed to an aromatic polyol prepared by reacting a phthalic acid residue with an amino alcohol. The reaction product is subsequently alkoxylated.

The amino alcohol that is reacted with the residue is an amino alcohol containing a primary or secondary amine group and a hydroxyl group.

Grigsby et al U.S. Patent No. 4,469,824, which issued Sept. 4, 1984, discloses a polyol useful in the production of polyurethane foam which is prepared by digesting recycled polyethyelene terephthalate with diethylene glycol and at least one other oxyalkylene glycol in the optional presence of a minor amount of a functionality-enhancing additive such as alpha methyl glucoside, glycerine, triethanolamine, sorbitol, etc.

SUMMARY OF THE INVENTION

In the preparation of rigid polyurethane and polyisocyanurate foams, improved results are obtained by using an etherified modified aromatic polyol alone or in admixture with other polyols. The etherified modified aromatic polyols are prepared by digesting a polyalkylene terephthalate with a low molecular weight polyol, to form a digested polyol; a minor amount of a low molecular weight polyhydroxy compound containing about 3 to about 8 hydroxyl groups is reacted with the digested polyol to form an intermediate reaction product which is then alkoxylated with ethylene oxide or propylene oxide or both to introduce ether functionalities onto the terminal ester linkages of the digestion product whereby the desired etherified modified aromatic polyol is provided.

The etherified modified aromatic polyols produced by this method have low viscosities, typically being below 15,000 cps, and are stable after long-term storage. The etherified modified aromatic polyols have improved solubility in fluorocarbon blowing agents, have comparatively low acid numbers and a functionality greater than 2.

DESCRIPTION OF THE SPECIFIC EMBODIMENTS

The components utilized for the manufacture of rigid polyurethane foam and rigid polyisocyanurate foam in accordance with the present invention include an etherified modified aromatic polyol of the present invention which is used alone or in admixture with a conventional polyol, an organic polyisocyanate, catalysts, a blowing agent, a surfactant and other conventional additives such as fire retardants, fillers, dyes, etc.

The Etherified Modified Aromatic Polyol

As indicated previously, the polyol that is used alone or in admixture with another polyol in accordance with the present invention is an etherified modified aromatic polyol prepared by alkoxylating an intermediate reaction product of (a) a minor amount of a low molecular weight polyhydroxy compound having about 3 to about 8 hydroxyl groups with (b) a digested polyol of the type prepared by digesting a polyalkylene terephthalate polymer with a low molecular weight polyol.

The Polyalkylene Terephthalate Polymer Raw Material

The polyalkylene terephthalate polymers which are the source of the etherified modified aromatic polyols of the present invention may be obtained from a variety of waste materials, such as used photographic films, X-ray films, and the like; synthetic fibers and waste materials generated during their manufacture; used plastic bottles and containers such as the soft plastic beverage containers now widely used by the soft drink industry; and waste materials from the production of other products made from polyalkylene terephththalate polymers.

Polyalkylene terephthalate polymers which are suitable for the present invention will generally have the formula:

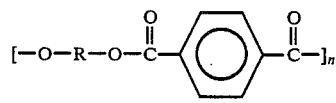

wherein R is a divalent aliphatic radical having from two to ten carbon atoms and attached to the adjacent oxygen atoms by saturated carbon atoms. Most frequently, R will be an ethylene radical to form polyethylene-terephthalate or will be a butylene radical to form polybutylene terephthalate. The number of recurring units n will generally be at least 75, frequently being 500 or greater, and the molecular weight will be greater than about 15,000, usually being greater than about 50,000 and normally in the range from about 50,000 to about 200,000.

The low molecular weight solvent used for digesting the polyalkylene terephthalate polymers is low molecular weight polyol.

Suitable polyols will typically be diols or triols, such as ethylene glycol, propylene glycol, butylene glycol, diethylene glycol, triethylene glycol, dipropylene glycol, butylene glycol, glycerol, trimethylolpropane, etc. Ethylene glycol and diethylene glycol are preferred.

Preparation of the Digestion Product

As stated hereinbefore, the process of the present invention will normally be carried out with waste or scrap polyalkylene terephthalate polymers, typically polyethylene terephthalate polymers in the form of used photographic film, used soda bottles, and the like. When using such recycled materials, it will be necessary to first clean the materials to remove dirt, oil, debris, labels, and the like. In the case of photographic films, it will be necessary to remove the emulsion layer and substratum from the film prior to digestion. The emulsion layer can be removed by washing with hot water, while the substratum is typically removed with an alkylene glycol or monoethanolamine wash. Useful methods for preparing spent photographic films are described in U.S. Pat. Nos. 3,503,904 to Dietz et al. and 3,928,253 to Thornton et al., the disclosures of which are incorporated herein by reference.

After cleaning, the polyalkylene terephthalate polymers will be cut up into small pieces, typically having dimensions from ¼ to ½ inch.

The chopped polyalkylene terephthalate polymer is then placed in a reactor vessel for digestion and subsequent processing. Conveniently, the reactor vessel is an agitated pressure vessel having a refluxing column at its top for collecting the overhead vapors, condensing such vapors, and returning them to the vessel. The volume of the reactor is not critical, with commercial reactors typically being 4,000 gallons or larger.

In carrying out the digestion step, the digesting solvent is first added to the vessel and heated prior to the addition of the polyalkylene terephthalate chips. The reaction temperature is not critical, with temperatures above 180° C., usually between 180° to 250° C., being suitable. The digesting solvent and polyalkylene terephthalate polymer are normally added at about a 1:1 molar ratio of solvent to segmer molar weight of polyalkylene terephthalate, however molar ratios of 0.5:1 to 1:0.5 can be used with satisfactory results (i.e., from about 0.5 to 2 moles of diethylene glycol per mole of polyethylene terephthalate). Nitrogen sparging is carried out during the digestion to remove water, while the reflux system returns the digesting solvent to the system.

The digestion reaction is endothermic and heat must be added during the course of the reaction. The digestion takes a number of hours, frequently from 5 to 30 hours, such as 5 to 10 hours, depending on the temperature at which it is carried out. At the end of the reaction, the temperature of the digestion mixture will rise, typically to above 200° C over the last one to two hours. When the reaction appears to be complete, the product can be tested to see if the expected hydroxyl number is present.

Preparation of the Etherified Modified Aromatic Polyol

At the end of the digestion reaction, and in accordance with the present invention, the digested polyol is mixed with from about 0.01 to about 0.7 moles and, more preferably, from about 0.05 to about 0.5 moles of the low molecular weight polyhydroxy compound per mole equivalent of polyethylene terephthalate starting material at an elevated temperature of less than about 200° C., such as a temperature within the range of about 120° to about 200° C. (e.g., 150° to about 170° C. and more preferably, about 160° to about 170° C.) for a period of time within the range of about 1 to 4 hours (preferably 1.5 to 2.5 hours) sufficient to incorporate the low molecular weight polyhydroxy compound with the digested polyol to form an intermediate product.

It has been discovered in accordance with the present invention that the alkoxylation of an intermediate product which has incorporated therein a minor amount of a low molecular weight polyhydroxy compound having about 3 to about 8 hydroxy groups provides an etherified modified aromatic polyol having improved physical properties (e.g., low viscosity, low acid number, improved fluorocarbon solubility) that can be used to more easily manufacture polyisocyanate and polyisocyanurate foams having enhanced physical properties.

The low molecular weight polyhydroxy compounds containing about 3 to about 8 hydroxy groups to be used in accordance with the present invention will suitably have an average molecular weight of about 90 to about 350 and, as indicated, a functionality of about 3 to 8. Illustrative of the polyhydroxy compounds that can be used alone or in admixture are compounds such as alpha methyl glucoside, glycerol, trimethylol propane, pentaerythritol, sorbitol, etc.; low protein, aldehyde-free sugars such as sucrose, mannitol, sorbitol, etc.

It has also been discovered in accordance with the present invention that the intermediate product should be etherified with from about 1 to 4 moles of propylene oxide and/or ethylene oxide per mole of polyethylene terephthalate starting material. Less desirable results are obtained when more than this amount of alkylene oxide is used. The alkoxylation reaction is exothermic, so the addition of the alkylene oxide should be done gradually so that the temperature in the reaction vessel does not exceed about 200° C (e.g., 150° to 180° C). The temperature is preferably maintained between about 160° and 170° C. From about 1 to about moles of alkylene oxide, and more preferably from about 2 to about 3 moles of alkylene oxide should be used, per mole equivalent of polyethylene terephthalate starting material.

The addition of the alkylene oxide forms ether linkages on the free hydroxyl groups present on the digested ester molecules. The alkoxylation reaction is typically carried out in the presence of a basic catalyst, such as an organic or inorganic base activator, such as sodium hydroxide, potassium hydroxide, sodium alkoxide, sodium methylate, a tertiary amine, such as triethylamine, and the like. The catalyst is usually added in an amount between 1 to 5% of the total weight of reactants. Upon completion of the alkoxylation, the end product is purged with nitrogen to remove unreacted alkylene oxides.

For example, about 0.5 mole equivalent of propylene oxide and about 1.5 mole equivalents of ethylene oxide may be used for each mole equivalent of polyethylene terephthalate to provide a product containing both primary and secondary hydroxyl groups. As another example, about 2 mole equivalents of ethylene oxide may be used for each mole equivalent of polyethylene terephthalate to provide a product containing primarily primary hydroxyl groups. As another example, 2 mole equivalents of propylene oxide may be used for each mole equivalent of polyethylene terephthalate to provide a product containing primarily secondary hydroxyl groups.

Preparation of Rigid Foam

The etherified modified aromatic polyols just described may be employed to produce polyurethane and polyisocyanurate foams in the conventional manner. The polyol is reacted with a suitable amount of an organic polyisocyanate in the presence of an appropriate blowing agent, catalyst, surfactant, fire retardants, fillers, etc.

The etherified modified aromatic polyol component of the present invention, may be used alone or in admixture with up to about 80 parts by weight of a polyoxypropylene polyol having a hydroxyl number between 200 and 800, preferably between 300 and 700 and more preferably between about 400 and about 600, and a functionality of 2 to 6, and preferably from about 3 to 6.

Normally, propylene oxide will constitute from about 15 to about 95 wt. % of the total polyol composition. Up to about 20 wt. % of ethylene oxide may be utilized if desired, based on the weight of the propylene oxide.

A wide variety of initiators may be alkoxylated to form useful polyoxypropylene polyols. Thus, for example, polyfunctional amines and alcohols of the following types may be alkoxylated: glycerol, trimethylolpropane, sorbitol, pentaerthyritol, mannitol, sucrose, etc.

Such above polyhydric alcohols may be reacted with an alkylene oxide component comprising 100 to about 80 wt. % of propylene oxide and 0 to about 20 wt. % of ethylene oxide using techniques known to those skilled in the art. Essentially such alkoxylations are carried out in the presence of a basic catalyst at a temperature sufficient to sustain the reaction. The hydroxyl number which is desired for the finished polyol will determine the amount of alkylene oxide used to react with the initiator. The oxyalkylene polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator with a mixture of propylene oxide and ethylene oxide to achieve a random distribution of such alkylene oxides. As noted above, the polyoxypropylene polyols useful here have a hydroxyl number ranging from about 200 to about 800. The reaction mixture is then neutralized and water and excess reactants are stripped from the polyol.

The Aromatic Polyisocyanate Component

Typical aromatic polyisocyanates that may be used in the practice of the present invention include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The more preferred methylene-bridged polyphenyl polyisocyanate mixtures used here contain from about 20 to about 100 wt. % methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known materials.

The Blowing Agent

In the production of rigid polyurethane foams in the practice of the invention, other known additives are necessary. One such constituent is the blowing agent. Water, which reacts with isocyanate groups to liberate carbon dioxide, can be used. Other examples of such materials are trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Still other useful blowing agents include low-boiling hydrocarbons such as butane, pentane, hexane, cyclohexane, and the like.

The Catalyst

The catalysts which may be used to make polyurethane foams are well known. There are two general types of catalyst, tertiary amines and organo-metallic compounds. Examples of suitable tertiary amines, used either individually or in admixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, diethylpiperazine, N-ethylmorpholine, dimethylaniline, nicotine, dimethylaminoethanol, tetramethylpropanediamine, and methyltriethylenediamine. Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. An amine and an organo-metallic compound are often used together in the polyurethane reaction. Selection of the individual catalysts and proportions to use in the polyurethane reaction are well within the knowledge of those skilled in the art.

The Fluorocarbon Solubilizer

A problem sometimes encountered in using the etherified modified aromatic polyols of the present invention in the manufacture of polyurethane and polyisocyanurate foams is the relatively poor solubility of the etherified modified aromatic polyols in the fluorocarbon blowing agent. This problem can be overcome by using a fluorocarbon solubilizer such as alkoxylated alkylphenols (e.g., a nine mole ethylene oxide adduct of nonyl phenol, ethylene oxide adducts of amines, such as tallow amine, stearyl amine, coco amines, lauryl amine, etc. From about 10 to about 50 wt. % of fluorocarbon solubilizer should be used, based on the etherified modified aromatic polyol.

Additional Components

Conventional formulation ingredients are also employed, such as, for example, foam stabilizers also known as silicone oils or emulsifiers. The foam stabilizer may be an organic silane or siloxane. For example, compounds may be used having the formula:

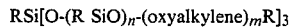

wherein R is an alkyl group containing from 1 to 4 carbon atoms; n is an integer of from 4 to 8; m is an integer of 20 to 40; and the oxyalkylene groups are derived from propylene oxide and ethylene oxide.

The flame retardancy of the polyurethane composition can be enhanced by using known fire retardants. Examples of suitable flame retardants are: tris(1,3-dichloropropyl)phos phate, dibromoneopentyl glycol, tris(2,3-dibromopropyl)phosphate, 2,2-bis(chloromethyl)-1,3 propylene bis[-di(2-chloroethyl)phosphate], tris(2-chloroethyl)phosphate, tris(2-chloropropyl)phosphate, bis(dichloropropyl)tribromopentyl phosphate, tetrakis-(2-chloroethyl)ethylene diphosphate (sold by Olin Chemicals as THERMOLIN® 101), FYROL® EFF (oligomeric chloroalkyl phosphate, sold by Stauffer Chemical Co.), tricresyl phosphate, cresyl diphenyl phosphate, chlorinated paraffins, and brominated paraffins. Halogenated phosphates that can be used include compounds such as tris(1,3-dichloropropyl)phosphate, tris(2-chloroethyl)phosphate, FYROL® EFF, and tetrakis(2-chloroethyl)ethylene diphosphate. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 20 to about 60 parts by weight per 100 parts by weight of polyol in the reaction mixture. It is preferred to use from about 20 to about 40 parts by weight.

The rigid polyurethane foams can be made in one step by reacting all the ingredients together at once (one-shot process) The rigid foams can also be made by the so-called "quasi-prepolymer method" wherein a portion of the polyol component is reacted in the absence of a catalyst with the polyisocyanate component in proportion so as to provide from about 20 percent to about 40 percent of free isocyanate groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

An advantageous aspect of the present invention is the comparative ease with which rigid polyurethane foams are made in the manner described above when using the polyol compositions of the present invention.

Polyisocyanurate Foams

The foregoing discussion has been concerned with the manufacture of polyurethane foam. Essentially the same factors are involved in the manufacture of polyisocyanurate foams. Isocyanurate groups are formed by the catalytic trimerization of organic isocyanates. The presence of isocyanurate groups in the rigid foam improves the fire retardancy properties.

Since the trimerization of an isocyanate is involved in the preparation of polyisocyanurate foams, it follows that an excess of the organic polyisocyanate ingredient must be employed (such as an excess of about 50 wt. % to about 200 wt. % or more), and the percentages of other ingredients adjusted with this in mind. The basic chemistry of monomeric isocyanurates and the preparation of isocyanurate foams is described in an article, "Isocyanurate Foams: Chemistry, Properties and Processing" by Reymore, et al. published in the *Journal of Cellular Plastics*, Nov./Dec. 1975, pp. 328–345.

Isocyanurate groups form under basic conditions, and it is therefore important that the amine catalyst component that is used in the preparation of the rigid foam have a basicity adequate to promote the formation of isocyanurate groups.

By way of example of suitable isocyanurate catalysts there may be used an alkali metal carboxylate such as sodium or lithium octoate, lithium stearate, etc., potassium acetate, potassium adipate, potassium stearate, potassium octoate, together with a tertiary amine such as N,N'-dimethylcyclohexylamine, N,N-dimethylbenzylamine, tetramethylethylenediamine, triethylenediamine, N,N-dimethylethanolamine, 2,4,6-tris(dimethylaminomethyl)phenol, etc. Quaternary ammonium compounds can also be used such as quaternary ammonium hydroxides (e.g., benzyl trimethyl ammonium hydroxide), etc.

When a flame retardant is used, it will preferably constitute about 5 to about 30 parts by weight per 100 parts by weight of polyol in the reaction mixture.

EXPERIMENTAL

EXAMPLE 1

Polyethylene terephthalate (PET) film chips (500 lbs.) were charged to a 200 gallon reactor with 272 lbs. of diethylene glycol (which is a 2.6:2.56 molar ratio of the respective components). The reactor was heated for 14 hours to a temperature of 230° C. with a nitrogen sparge until the PET was completely digested by the solvent. A vacuum was pulled to remove excess moisture. The reaction mixture was cooled to 160° C. and sodium acetate catalyst was charged. The digested polyol was further sparged with nitrogen to remove additional free moisture. Next, about 0.25 mole equivalents of alpha methyl glucoside (based on the starting PET material) were added and the mixture was heated for about 1.5 hours at about 220° C. to incorporate the methyl glucoside with the PET digestion product. The intermediate product was cooled to about 150°-180° C. and then, after an additional nitrogen sparge, a mixture of about 0.5 mole equivalents of propylene oxide and about 1.5 mole equivalents of ethylene oxide (based on the starting PET material) were slowly added while maintaining the temperature at 160° C. throughout the alkoxylation. Upon completion of the alkoxylation, the temperature was dropped to 120° C. and light fractions were stripped with a nitrogen purge.

Final hydroxyl number: 350
Viscosity: 10,000 cps
Acid no.: 1.0

EXAMPLE 2

A series of tests was conducted in the manufacture of rigid polyurethane foam using the etherified modified aromatic polyol of Example 1. In preparing the foams, the A-component was a polymeric isocyanate and the B-component was a simulated commercial formulation comprising the polyol of Example 1.

The A-component and the B-component were separately prepared and then hand mixed and poured into a paper containers. The formulations prepared and the results obtained are set out in Table I.

TABLE I

SUMMARY OF HAND MIXED FOAMS BASED ON ETHERIFIED MODIFIED AROMATIC POLYOL (Index 2.5)

|  | 1 | 2 | 3 | 4 | 5 | 6 | 7 |
|---|---|---|---|---|---|---|---|
| Formulation, pbw |  |  |  |  |  |  |  |
| Polyol of Example 1 | 75.0 | 75.0 | 75.0 | 75.0 | 75.0 | 75.0 | 80.0 |
| C-5426[1] | 25.0 | 25.0 | 20.0 | 20.0 | 15.0 | 15.0 | 10.0 |
| ANTIBLAZE 80[2] | — | — | 5.0 | 5.0 | 10.0 | 10.0 | 10.0 |
| Catalyst T-45[3] | 2.0 | 2.0 | 2.0 | 2.0 | 2.0 | 2.0 | 2.0 |
| DMP-30[4] | 0.30 | 0.30 | 0.30 | 0.30 | 0.30 | 0.30 | 0.42 |
| DC-193[5] | 4.0 | 4.0 | 4.0 | 4.0 | 4.0 | 4.0 | 4.0 |
| R-11B[6] | 40.0 | 44.0 | 40.0 | 44.0 | 40.0 | 44.0 | 40.0 |
| Total B-Component | 146.3 | 150.3 | 146.3 | 150.3 | 146.3 | 150.3 | 146.4 |
| PAPI-135[7] | 169.0 | 169.0 | 166.0 | 166.0 | 163.0 | 163.0 | 171.0 |
| Total A + B | 315.3 | 319.3 | 312.3 | 316.3 | 309.3 | 313.3 | 317.5 |
| Wt. % R-11 in A + B | 12.6 | 13.8 | 12.8 | 13.8 | 12.9 | 14.0 | 12.6 |
| Reaction Rate |  |  |  |  |  |  |  |
| Cream Time, sec. | 13 | 10 | 14 | 13 | 13 | 12 | 14 |
| Gel Time, sec. | 30 | 30 | 33 | 32 | 35 | 38 | 38 |
| Tack Free Time, sec. | 43 | 41 | 45 | 46 | 48 | 59 | 55 |
| Surface Friability | None | None | None | None | V. Slight | None | Slight |
| Foam Density, PCF | 1.86 | 1.78 | 1.84 | 1.80 | 1.88 | 1.73 | 1.94 |

[1] A solubilizer sold by Whitco Chemical Company.
[2] Tris (2-chloropropyl) phosphate.
[3] Potassium octoate dissolved in a glycol.
[4] 2,4,6-Tris (dimethylaminoethyl) phenol.
[5] Dow-Corning silicone surfactant.
[6] Trichloromonofluoromethane, sold by DuPont Chemical Company.
[7] Polymeric isocyanate, UpJohn Company.

It will be observed from the results reported in Table I that in all instances the formulations exhibited good reaction profiles, having good cream times, gel times and tack free times. Foam density was also good.

Of particular significance is the absence of friability in the foams; surface friability being absent in all of the formulations except for formulations 5 and 7, where there was slight, but acceptable friability.

EXAMPLE 3

Because of the excellent results obtained in the initial evaluation of the polyol of Example 1 in Example 2, a more extended evaluation of the polyol was made in commercial equipment used for the preparation of panels.

The formulations employed and the results obtained are set out in Tables II and III.

TABLE II

THE EVALUATION OF ETHERIFIED MODIFIED AROMATIC POLYOL
Panel Preparation

|  | NCO/OH INDEX |  |  |  |
|---|---|---|---|---|
| Formulation, pbw | 2.5 | 3.0 | 3.5 | 4.0 |
| B-Component |  |  |  |  |
| Polyol of Example 1 | 75 | 75 | 70 | 70 |
| Solubilizer C-5426 | 25 | 25 | 30 | 30 |
| Curithane 97[1] | 7 | 7 | 7 | 7 |
| Catalyst T-45 | — | — | — | 1 |
| DC-193 | 4 | 4 | 4 | 4 |
| R-11B | 40 | 47 | 55 | 63 |
| Total B-Component | 151 | 158 | 166 | 175 |
| A-Component |  |  |  |  |
| PAPI 135 | 197 | 236 | 265 | 304 |
| Total A + B | 348 | 394 | 431 | 479 |
| Appearance of B-Component | Sl. cloudy but no separation |  |  |  |
| Viscosity of B-Component | 280 | 220 | 150 | 130 |
| Wt. % R-11 in A + B | 11.5 | 11.9 | 12.8 | 13.2 |
| Reaction Rate at 70° F., Seconds |  |  |  |  |
| Cream time | 11 | 13 | 14 | 12 |
| Gel time | 28 | 34 | 38 | 32 |
| Tack free time | 33 | 43 | 48 | 38 |
| Surface friability of box pour | Slight at edges |  |  |  |
| Full panel thickness, inches | 3.1 | 2.9 | 3.0 | 2.8 |
| Laminator Temp., °F. |  |  |  |  |
| Bottom | 140 | 460 | 152 | 178 |
| Top | 170 | 176 | 178 | 182 |
| Shrinkage of Panel in First 24 Hours |  |  |  |  |
| 104 inch length, inches | 1.5 | 1.0 | 1.0 | 1.25 |
| 34 inch width, inches | 0.25 | 0.19 | 0.12 | 0.06 |
| Adhesion to aluminum and paper | All good |  |  |  |
| Density, PCF |  |  |  |  |
| After facers were pulled off | 1.78 | 1.88 | 1.86 | 1.97 |
| 1.5 inch core | 1.71 | 1.79 | 1.69 | 1.88 |
| Box pour | 1.72 | 1.81 | 1.75 | 1.88 |
| Comp. strength samples, 2 inch core | 1.81 | 1.80 | 1.82 | 1.92 |
| Compressive Strength, psi |  |  |  |  |
| Across thickness | 24 | 18 | 20 | 19 |
| Across length | 12 | 11 | 11 | 15 |
| Across width | 13 | 14 | 14 | 19 |

TABLE II-continued
THE EVALUATION OF ETHERIFIED MODIFIED AROMATIC POLYOL
Panel Preparation

| Formulation, pbw | NCO/OH INDEX | | | |
|---|---|---|---|---|
| | 2.5 | 3.0 | 3.5 | 4.0 |
| K-Factor | 0.116 | 0.124 | 0.123 | 0.125 |
| | 0.119 | | | |
| Density of K-factor samples | 1.83 | 1.83 | 2.15 | 2.25 |
| Interior friability, wt. less, %, 10 min. | 4 | 12 | 19 | 30 |
| ASTM E-84 (2 inch core) | | | | |
| Smoke | 105 | 140 | 110 | 195 |
| Flame spread | 26.9 | 28.8 | 26.1 | 31.6 |

[1]Curithane 97 is an isocyanurate catalyst manufactured and sold by UpJohn.

TABLE III
THE EVALUATION OF ETHERIFIED MODIFIED AROMATIC POLYOL
Panel Preparation
Dimensional Stability of Panels

| NCO/OH Index | | 2.5 | 3.0 | 3.5 | 4.0 |
|---|---|---|---|---|---|
| Dimensional Stability | | | | | |
| % Change | 7 Days | | | | |
| −10° F. | Thickness | −0.8 | −0.4 | −0.2 | −0.1 |
| % Change | 7 Days | | | | |
| 300° F. | Thickness | −1.3 | +0.2 | +0.4 | +0.3 |
| | Length | +5.8 | +5.0 | +5.3 | +2.1 |
| | Width | +3.2 | +1.5 | +2.3 | +0.3 |
| | Volume | +8.2 | +6.8 | +8.1 | +2.7 |
| % Change | 28 Days | | | | |
| 158° F. | Thickness | −1.2 | +1.7 | +0.3 | +0.5 |
| 95% R.H. | Length | +3.1 | +3.7 | +3.3 | +1.8 |
| | Width | +1.4 | +3.6 | +1.2 | +0.3 |
| | Volume | +3.2 | +4.4 | +4.9 | +2.6 |

As can be seen from the results reported in Tables II and III, the polyol of Example 1 gave unexpectedly outstanding results in the manufacture of polyisocyanurate panels.

Again, the formulations exhibited a good reaction profile and good friability characteristics.

Dimensional stability and adhesion were good.

The panels had good density properties and excellent compressive strength.

Satisfactory K-factors were obtained in all instances. Of particular significance is the result of the ASTM E-84 test which indicates that the panels prepared using the polyol of the present invention had very low smoke propagation values and very low flame spread values, qualifying them for a class I and class II rating.

EXAMPLE 4

An etherified modified aromatic polyol was prepared for use in the preparation of polyisocyanurate panels. The etherified modified aromatic polyol was prepared by digesting polyethylene terephthalate with diethylene glycol to form a digestion product into which was incorporated about 0.25 mole of alpha methyl glucoside per mole equivalent of polyethylene terephthalate to form an intermediate that was alkoxylated with about 0.5 mole equivalent of propylene oxide and about 1.5 equivalents of ethylene oxide mole per mol equivalent of polyethylene terephthalate. The product had a Hydroxyl Number of 350, a Viscosity, cps., 25° C. of 7,000, an acid number (Max.) of 1.0 and contained about 0.1 wt. % of water (max.).

The etherified modified aromatic polyol, just described was used in the preparation of polyisocyanurate panels on a laminator adjusted to provide panels having a thickness of three inches. All of the formulations gave good flow and the foam had good adhesion to paper and aluminum facers. Catalyst levels were adjusted to give cream times ranging from about 10 to 12 seconds with gel times of 28 to 38 seconds and tack free times of 32 to 48 seconds. Overall panel densities ranged from 1.78 PCF for a low isocyanate index formulation to 1.97 PCF for a high isocyanate index formulation. The physical properties of the panels were excellent and essentially independent of isocyanate index. Of particular interest is the excellent stability at 300° F., indicating good completion of the isocyanurate reaction, even at the isocyanate index of 2.5PCF. The formulations used and the results obtained are summarized in the following Table IV:

TABLE IV
EVALUATION OF ETHERIFIED MODIFIED AROMATIC POLYOL IN THE PREPARATION OF POLYISOCYANURATE PANELS

| | | Isocyanate Index | | | |
|---|---|---|---|---|---|
| | | 2.5 | 3.0 | 3.5 | 4.0 |
| | Formulations | | | | |
| B-COMPONENT | | | | | |
| Etherified Modified Aromatic Polyol[1] | | 75 | 75 | 70 | 70 |
| Solubilizer[2] | | 25 | 25 | 30 | 30 |
| Curithane 97[3] | | 7 | 7 | 7 | 7 |
| Catalyst T-45[4] | | — | — | — | 1 |
| DC-193[5] | | 4 | 4 | 4 | 4 |
| R-11A[6] | | 40 | 47 | 55 | 63 |
| Total B-Component | | 151 | 158 | 166 | 175 |
| A-Component PAPI 135[7] | | 197 | 236 | 265 | 304 |
| Viscosity, B-Component | | 280 | 220 | 150 | 130 |
| Reaction Rate, 70° F. | | | | | |
| Cream Time, Sec. | | 11 | 13 | 14 | 12 |
| Gel time, Sec. | | 28 | 34 | 38 | 32 |
| Tack free time, Sec. | | 33 | 43 | 48 | 38 |
| Laminator Temp. °F. | | | | | |
| Bottom | | 140 | 160 | 152 | 178 |
| Top | | 170 | 176 | 178 | 182 |
| Physical Properties | | | | | |
| DENSITY, PCF | | | | | |
| Facers Removed | | 1.78 | 1.88 | 1.86 | 1.97 |
| 1.5 inch core | | 1.71 | 1.79 | 1.69 | 1.88 |
| Compressive Strength, psi | | | | | |
| Across Thickness | | 24 | 18 | 20 | 19 |
| Across Length | | 12 | 11 | 11 | 15 |
| Across Width | | 13 | 14 | 14 | 19 |
| Interior Friability, wt. loss, %, 10 min. | | 4 | 12 | 19 | 30 |
| K-Factor | | 0.116 | 0.124 | 0.123 | 0.125 |
| Dimensional Stability | | | | | |
| % Change | 7 Days | | | | |
| −10° F. | Thickness | −0.8 | −0.4 | −0.2 | −0.1 |
| % Change | 7 Days | | | | |
| 300° F. | Thickness | −1.3 | +0.2 | +0.4 | +0.3 |
| | Length | +5.8 | +5.0 | +5.3 | +2.1 |
| | Width | +3.2 | +1.5 | +2.3 | +0.3 |
| | Volume | +8.2 | +6.8 | +8.1 | +2.7 |
| % Change | 28 Days | | | | |
| 158° F. | Thickness | −1.2 | +0.2 | +0.4 | +0.3 |
| 95% R.H. | Length | +3.1 | +3.7 | +3.3 | +1.8 |
| | Width | +1.4 | +3.6 | +1.2 | +0.3 |
| | Volume | +3.2 | +4.4 | +4.9 | +2.6 |
| ASTM E-84 (2 inch Core) | | | | | |
| Smoke | | 105 | 140 | 110 | 195 |

TABLE IV-continued
EVALUATION OF
ETHERIFIED MODIFIED AROMATIC POLYOL
IN THE
PREPARATION OF POLYISOCYANURATE PANELS

|  | Isocyanate Index | | | |
| --- | --- | --- | --- | --- |
|  | 2.5 | 3.0 | 3.5 | 4.0 |
| Flame Spread | 26.9 | 28.8 | 26.1 | 31.6 |

[1] Functionality, 2.4
[2] Witco, cocoamine-ethylene oxide adduct
[3] Isocyanurate Catalyst, UpJohn Co,
[4] Potassium Octoate, M & T Chemicals
[5] Silicone Surfactant
[6] Fluorocarbon Blowing Agent
[7] Polyphenyl Polyisocyanate, Upjohn Mfg. Co.

It will be understood that the foregoing examples are given by way of illustration only and not by way of limitation and that the scope of the present invention is defined solely by the appended claims.

What is claimed is;

1. In a method of preparing a rigid polyurethane foam composition wherein an excess of an aromatic polyisocyanate is reacted with a polyol component in the presence of a catalyst, a blowing agent and a surfactant;
the improvement for obtaining a rigid polyurethane foam having improved properties which comprises:
utilizing a polyol component comprising an etherified modified aromatic polyol, said etherified modified aromatic polyol having been prepared by:
digesting a polyalkylene terephthalate with a low molecular weight polyol selected from a group consisting essentially of ethylene glycol, propylene glycol, butylene glycol, diethylene glycol, triethylene glycol, dipropylene glycol, glycerol, and trimethyol propane with the ratio of about 0.5 to about 1 mole equivalents of polyalkylene terephthalate to about 1 to about 0.5 moles of low molecular weight polyol at a temperature of about 180° to about 250° C. to provide a digested polyol;
reacting said digested polyol with about 0.01 to about 0.7 moles of an additional low molecular weight polyol containing from about 3 to about 8 hydroxyl groups and a molecular weight from about 90 to about 350 per mole equivalent of polyalkylene terephthalate at a temperature of about 120° to about 200° C. from about 1 to about 4 hours to form an intermediate reaction product; and
alkoxylating in the presence of a basic alkoxylation catalyst said intermediate product with an alkoxylation component comprising from about 1 to about 4 mole equivalents of alkylene oxide per mole equivalent of said polyalkylene terephthalate, said alkylene oxide consisting of from 0 to about 4 moles of ethylene oxide and, correspondingly, from 4 to about 0 moles of propylene oxide with the temperature not exceeding about 200° C.

2. A method as in claim 1 wherein the polyalkylene terephthalate is a polyethylene terephthalate, wherein the low molecular weight polyol is selected from the group consisting of ethylene glycol, propylene glycol, butylene glycol diethylene glycol triethylene glycol, dipropylene glycol, glycerol and trimethylolpropane and wherein the polyethylene terephthalate is reacted with about 0.5 to 2 moles of low molecular weight polyol per mole of polyethylene terephthalate at a temperature of about 180° to about 250° C. for about 5 to 30 hours to provide the digested polyol.

3. A method as in claim 2 wherein the low molecular weight polyhydroxy compound is selected from the group consisting of alpha methyl glucoside, glycerol, trimethylolpropane, pentaerylthritol, sorbitol, sucrose, and mannitol and wherein the digested product is reacted with from about 0.01 to about 0.7 moles of said polyhydroxy compound, per mole of polyethylene terephthalate used in making the digested product, at a temperature of about 120° to about 200° C. for about 1 to 4 hours to provide the intermediate product.

4. A method as in claim 3 wherein the alkylene oxide component reacted with the intermediate product consists of about 0.5 mole equivalent of propylene oxide and about 1.5 mole equivalents of ethylene oxide per mole equivalent of polyethylene terephthalate and wherein the alkoxylation is conducted under basic conditions at a temperature of about 150° to about 200° C.

5. A method as in claim 3 wherein the alkylene oxide component reacted with the intermediate product consists of about 2 mole equivalents of ethylene oxide per mole equivalent of said polyethylene terephthalate and wherein the alkoxylation is conducted under basic conditions at a temperature of about 150° to about 200° C.

6. A method as in claim 3 wherein the alkylene oxide component reacted with the intermediate product consists of about 2 mole equivalents of propylene oxide per mole equivalent of said polyethylene terephthalate and wherein the alkoxylation is conducted under basic conditions at a temperature of about 150° to about 200° C.

7. In a method for the preparation of a rigid polyisocyanurate foam composition wherein an excess of an aromatic polyisocyanate is reacted with a polyol component in the presence of an isocyanurate catalyst, a blowing agent, and a surfactant under basic conditions:
the improvement for obtaining a rigid polyisocyanurate foam having improved properties which comprises:
utilizing a polyol component comprising an etherified modified aromatic polyol, said etherified modified aromatic polyol having been prepared by:
digesting a polyalkylene terephthatlate with a low molecular weight polyol selected from a group consisting essentially of ethylene glycol, propylene glycol, butylene glycol, diethylene glycol, triethylene glycol, dipropylene glycol, glycerol, and trimethyol propane with the ratio of about 0.5 to about 1 mole equivalents of polyalkylene terephthalate to about 1 to about 0.5 moles of low molecular weight polyol at a temperature of about 180° to about 250° C. to provide a digested polyol;
reacting said digested polyol with about 0.01 to about 0.7 moles of an additional low molecular weight polyol containing about 3 to about 8 hydroxyl groups and a molecular weight from about 90 to about 350 per mole equivalent of polyalkylene terephthalate at a temperature of about 120° to about 200° C. from about 1 to about 4 hours to form an intermediate product; and
alkoxylating in the presence of a basic alkoxylation catalyst said intermediate product with an alkoxylation component comprising from about 1 to about 4 mole equivalents of alkylene oxide per mole equivalent of said polyalkylene terephthalate, said alkylene oxide consisting of from 0 to about 4 moles of ethylene oxide and, correspondingly, from 4 to about 0 moles of propylene oxide with the temperature not exceeding about 200° C.

8. A method as in claim 7 wherein the polyalkylene terephthalate is a polyethylene terephthalate, wherein the low molecular weight polyol is selected from the group consisting of ethylene glycol, propylene glycol, butylene glycol, diethylene glycol, triethylene glycol, dipropylene glycol, glycerol and trimethylolpropane and wherein the polyethylene terephthalate is reacted with about 0.5 to 2 moles of low molecular weight polyol per mole of polyethylene terephthalate at a temperature of about 180° to about 250° C. for about 5 to 30 hours to provide the digested polyol.

9. A method as in claim 8 wherein the low molecular weight polyhydroxy compound is selected from the group consisting of alpha methyl glucoside, glycerol, trimethylolpropane, oentaerylthritol, sorbitol, sucrose, and mannitol and wherein the digested product is reacted with from about 0.01 to about 0.7 moles of said polyhydroxy compound, per mole of polyethylene terephthalate used in making the digested product, at a temperature of about 120° to about 200° C. for about 1 to 4 hours to provide the intermediate product.

10. A method as in claim 9 wherein the alkylene oxide component reacted with the intermediate product consists of about 0.5 mole equivalents of propylene oxide and about 1.5 mole equivalents of ethylene oxide per mole equivalent of polyethylene terephthalate and wherein the alkoxylation is conducted under basic conditions at a temperature of about 150° to about 200°0 C.

11. A method as in claim 9 wherein the alkylene oxide component reacted with the intermediate product consists of about 2 mole equivalents of ethylene oxide per mole equivalent of said polyethylene terephthalate and wherein the alkoxylation is conducted under basic conditions at a temperature of about 150° to about 200° C.

12. A method as in claim 9 wherein the alkylene oxide component reacted with the intermediate product consists of about 2 mole equivalents of propylene oxide per mole equivalent of said polyethylene terephthalate and wherein the alkoxylation is conducted under basic conditions at a temperature of about 150° to about 200° C.

13. A rigid polyurethane foam composition prepared by reacting an excess of an aromatic polyisocyanate with a polyol component in the presence of a catalyst, a blowing agent and a surfactant:
said polyol component being composed of from 100 to about 80 wt. % of an etherified modified aromatic polyol and, correspondingly , from 0 to about 20 wt. % of a polyoxyalkylene polyol component, said etherified modified aromatic polyol having been prepared by:
digesting a polyalkylene terephthalate with a low molecular weight polyol selected from a group consisting essentially of ethylene glycol, propylene glycoo, butylene glycol, diethylene glycol, triethylene glycol, dipropylene glycol, glycerol, and trimethyol propane with the ratio of about 0.5 to about 1 mole equivalents of polyalkylene terephthalate to about 1 to about 0.5 moles of low molecular weight polyol at a temperature of about 180° to about 250° C. to provide a digested polyol;
reacting said digested polyol with about 0.01 to about 0.7 moles of an additional low molecular weight polyol containing from about 3 to about 8 hydroxyl groups and a molecular weight from about 90 to about 350 per mole equivalent of polyalkylene terephthalate at a temperature of about 120° to about 200° C. from about 1 to about 4 hours to form an intermediate product; and
alkoxylating in the presence of a basic alkoxylation catalyst said intermediate product with an alkoxylation component comprising from about 1 to about 4 moles equivalents of alkylene oxide per mole equivalent of said polyalkylene terephthalate, said alkylene oxide consisting of from 0 to about 4 moles of ethylene oxide and, correspondingly, from 4 moles to about 0 moles of propylene oxide with the temperature not exceeding about 200° C.;
said polyoxyalkylene polyol component having been prepared by reacting an initiator having a functionality of about 3 to about 6 with an alkylene oxide component consisting of from 100 to about 80 wt. % of propylene oxide and 0 to about 20 wt. % of ethylene oxide; and
said polyoxyalkylene polyol component having a hydroxyl number of about 200 to about 800.

14. A method as in claim 13 wherein the polyalkylene terephthalate is a polyethylene terephthalate, wherein the low molecular weight polyol is diethylene glycol and wherein the polyethylene terephthalate is reacted with about 0.5 to 2 moles of diethylene glycol per mole of polyethylene terephthalate at a temperature of about 180° to about 250° C. for about 5 to 30 hours to provide the digested polyol.

15. A method as in claim 14 wherein the low molecular weight polyhydroxy compound is alpha methyl glucoside and wherein the digested product is reacted with from about 0.01 to about 0.7 moles of alpha methyl glucoside, per mole of polyethylene terephthalate used in making the digested product, at a temperature of about 120° to about 200° C. for about 1 to 4 hours to provide the intermediate product.

16. A method as in claim 15 wherein the alkylene oxide component reacted with the intermediate product consists of about 0.5 mole equivalent of propylene oxide and about 1.5 mole equivalents of ethylene oxide per mole equivalent of polyethylene terephthalate and wherein the alkoxylation is conducted under basic conditions at a temperature of about 150° to about 200° C.

17. A method as in claim 15 wherein the alkylene oxide component reacted with the intermediate product consists of about 2 mole equivalents of ethylene oxide per mole equivalent of said polyethylene terephthalate and wherein the alkoxylation is conducted under basic conditions at a temperature of about 150° to about 200° C.

18. A method as in claim 15 wherein the alkylene oxide component reacted with the intermediate product consists of about 2 mole equivalents of propylene oxide per mole equivalent of said polyethylene terephthalate and wherein the alkoxylation is conducted under basic conditions at a temperature of about 150° to about 200° C.

19. A rigid polyisocyanurate foam composition prepared by reacting an excess of an aromatic polyisocyanate with a polyol component in the presence of an isocyanurate catalyst, a blowing agent and a surfactant under basic conditions: said polyol component being composed of from 100 to about 80 wt. % of an etherified modified aromatic polyol and, correspondingly, from 0 to about 20 wt. % of a polyoxyalkylene polyol component having a hydroxyl number of about 200 to 800, said etherified modified aromatic polyol having been prepared by:
digesting a polyalkylene terephthalate with a low molecular weight polyol selected from a group consisting essentially of ethylene glycol, propylene glycol, butylene glycol, diethylene glycol, triethylene glycol, dipropylene glycol, glycerol, and trimethyol propane with the ratio of about 0.5 to about 1 mole equivalents of polyalkylene terephthalate to about 1 to about 0.5 moles of low molecular weight polyol at a temperature of about 180° to about 250° C. to provide a digested polyol;

reacting said digested polyol with about 0.01 to about 0.7 moles of an additional low molecular weight polyol containing from about 3 to about 8 hydroxyl groups and a molecular weight from about 90 to about 350 per mole equivalent of polyalkylene terephthalate at a temperature of about 120° to about 200° C. from about 1 to about 4 hours to form an intermediate product; and alkoxylating in the presence of a basic alkoxylation catalyst said intermediate product with an alkoxylation component comprising from about 1 to about 4 mole equivalents of alkylene oxide per mole equivalent of said polyalkylene terephthalate, said alkylene oxide consisting of from 0 to about 4 moles of ethyelen oxide and, correspondingly, from 4 moles to about 0 moles of propylene oxide with the temperature not exceeding about 200° C.;

said polyoxyalkylene polyol component having been prepared by reacting an initiator having a functionality of about 3 to about 6 with an alkylene oxide component consisting of from 100 to about 80 wt. % of propylene oxide and 0 to about 20 wt. % of ethylene oxide.

20. A method as in claim 19 wherein the polyalkylene terephthalate is a polyethylene terephthalate, wherein the low molecular weight polyol is diethylene glycol and wherein the polyethylene terephthalate is reacted with about 0.5 to 2 moles of diethylene glycol per mole of polyethylene terephthalate at a temperature of about 180° to about 250° C. for about 5 to 30 hours to provide the digested polyol.

21. A method as in claim 20 wherein the low molecular weight polyhydroxy compound is alpha methyl glucoside and wherein the digested product is reacted with from about 0.01 to about 0.7 moles of alpha methyl glucoside, per mole of polyethylene terephthalate used in making the digested product, at a temperature of about 120° to about 200° C. for about 1 to 4 hours to provide the intermediate product.

22. A method as in claim 21 wherein the alkylene oxide component reacted with the intermediate product consists of about 0.5 mole equivalent of propylene oxide and about 1.5 mole equivalents of ethylene oxide per mole equivalent of polyethylene terephthalate and wherein the alkoxylation is conducted under basic conditions at a temperature of about 150° to about 200° C.

23. A method as in claim 21 wherein the alkylene oxide component reacted with the intermediate product consists of about 2 mole equivalents of ethylene oxide per mole equivalent of said polyethylene terephthalate and wherein the alkoxylation is conducted under basic conditions at a temperature of about 150° to about 200° C.

24. A method as in claim 21 wherein the alkylene oxide component reacted with the intermediate product consists of about 2 mole equivalents of propylene oxide per mole equivalent of said polyethylene terephthalate and wherein the alkoxylation is conducted under basic conditions at a temperature of about 150° to about 200° C.

25. A rigid polyisocyanurate foam composition prepared by reacting an excess of an aromatic polyisocyanate with a polyol component in the presence of a catalyst, a blowing agent and a surfactant:

said polyol component being composed of from about 10% to about 50% fluorocarbon solubilizer and, correspondingly, from about 90% to about 50% of an etherified modified aromatic polyol having been prepared by:

digesting a polyalkylene terephthalate with a low molecular weight polyol selected from a group consisting essentially of ethylene glycol, propylene glycol, butylene glycol, diethylene glycol, triethylene glycol, dipropylene glycol, glycerol, and trimethol propane with the ratio of about 0.5 to about 1 mole equivalents of polyalkylene terephthalate to about 1 to about 0.5 moles of low molecular weight polyol at a temperature of about 180° to about 250° C. to provide a digested polyol;

reacting said digested polyol with about 0.01 to about 0.7 moles of an additional low molecular weight polyol containing from about 3 to about 8 hydroxyl groups and a molecular weight from about 90 to about 350 per mole equivalent of polyalkylene terephthalate at a temperature of about 120° to about 200° C. from about 1 to about 4 hours to form an intermediate product; and alkoxylating in the presence of a basic alkoxylation catalyst said intermediate product with an alkoxylation component comprising from about 1 to about 4 mole equivalents of alkylene oxide per mole equivalent of said polyalkylene terephthalate, said alkylene oxide consisting of from 0 to about 4 moles of ethylene oxide and, correspondingly, from 4 moles to about 0 moles of propylene oxide with the temperature not exceeding about 200° C.

26. A rigid polyisocyanurate foam composition prepared as in claim 25 wherein said fluorocarbon solubilizer is an alkoxylated alkylphenol.

27. A rigid polyisocyanurate foam composition prepared as in claim 25 wherein said fluorocarbon solubilizer is an alkoxylated amine.

* * * * *